United States Patent [19]

Franzen

[11] Patent Number: 4,619,761
[45] Date of Patent: Oct. 28, 1986

[54] METHOD FOR SCREENING OR FRACTIONATION

[75] Inventor: Rune G. Franzen, Williamsport, Pa.

[73] Assignee: Koppers Company, Inc., Pittsburgh, Pa.

[21] Appl. No.: 683,820

[22] Filed: Dec. 20, 1984

[51] Int. Cl.$^4$ .......................... B07B 1/00; B07B 1/04; D21C 9/08
[52] U.S. Cl. .................................. 209/250; 209/273; 209/255; 210/414; 162/55
[58] Field of Search ............... 209/273, 268, 242, 240, 209/1, 233, 263, 12, 17, 2, 250, 255; 210/414, 415, 335, 336, 422, 196, 195, 5, 194; 162/4, 55, 41, 264, 43

[56]  References Cited
U.S. PATENT DOCUMENTS

| | | | |
|---|---|---|---|
| 392,719 | 11/1888 | Cloudman | 209/273 |
| 784,743 | 3/1905 | Hemings | 209/273 |
| 2,087,775 | 7/1937 | Matthews | 210/194 |
| 3,232,436 | 2/1966 | Nilsson | 210/298 |
| 3,506,121 | 4/1970 | Holm | 209/273 |
| 3,511,373 | 5/1970 | McKibben et al. | 209/234 |
| 3,720,315 | 3/1973 | Kaiser | 209/211 |
| 3,947,314 | 3/1976 | Chupka et al. | 209/273 |
| 4,059,506 | 11/1977 | Bryson | 209/211 |
| 4,067,801 | 1/1978 | Ishida et al. | 210/195.3 |
| 4,215,447 | 8/1980 | Gartland et al. | 162/44 |
| 4,253,945 | 3/1981 | Karnis | 209/211 |
| 4,264,437 | 4/1981 | Hayes, Jr. | 209/273 |
| 4,302,327 | 11/1981 | Martin | 209/240 |
| 4,504,016 | 3/1985 | Wikdahl | 162/55 |

FOREIGN PATENT DOCUMENTS

| | | | |
|---|---|---|---|
| 193239 | 11/1957 | German Democratic Rep. | 162/4 |
| 2109260 | 6/1983 | United Kingdom | 209/211 |
| 349414 | 9/1972 | U.S.S.R. | 209/12 |

OTHER PUBLICATIONS

D. L. Young "Pressure Screening—Principles and Practice" APPITA 35th Annual Conference 1981.

Primary Examiner—S. Leon Bashore
Assistant Examiner—Thomas M. Lithgow
Attorney, Agent, or Firm—Daniel J. Long; Herbert J. Zeh, Jr.

[57] ABSTRACT

An improved method for screening and fractionation. By using a housing interiorly divided by a screen plate into a primary and a secondary chamber with the secondary chamber further divided by a fluid impermeable wall, a process fluid stream containing particulate material has a second and a third process fluid stream diverted from it. The second stream is outputed from the housing while the third stream is recirculated to the first chamber. It is demonstrated that high screening or fractionation efficiency is obtained by this method.

15 Claims, 6 Drawing Figures

METHOD FOR SCREENING OR FRACTIONATION

FIELD OF THE INVENTION

The present invention relates to methods for the screening and fractionation of particulate materials and, in particular, to such methods in which particulate material is suspended in a fluid medium.

BRIEF DESCRIPTION OF THE PRIOR ART

In a number of industries, the separation of solid particles of different sizes suspended in a gas or liquid is accomplished by screening or fractionation. Screening generally refers to the removal of some undersirable particulate material from a product flow. Fractionation involves the dividing of a product flow into two or more different product flows to allow, for example, separate processing or use.

Various types of screening and fractionation equipment are known in the art. One such general class of equipment is known as a fluid or hydraulically feed mechanical screen. In such devices one or more screen plates positioned inside a housing serve to separate a feed flow of water or other fluid with suspended particles into two or more separate streams. The size and shape of screen perforations are selected so that particles having particular characteristics will tend to be entrained in one of these streams while particles having other characteristics will tend to be entrained in the other stream.

Screening or fractionation efficiency is known to be a function of the shape of the particles to be separated, the perforation of the screen plate and the general operating conditions of the screen. It is well known that screening or fractionation efficiency can be increased by installing additional stages of screening or fractionation equipment. The use of such additional equipment can be expensive both in terms of initial capital costs and in subsequent operating costs. It is, therefore, the object of the present invention to obtain the advantages of a multi-stage screening or fractionation device system while avoiding some of the additional costs heretofore associated with such systems.

SUMMARY OF THE INVENTION

In the present invention screening or factionation is conducted on a stream of process fluid containing particulate material made up of two classes of particles. These classes may, for example, be distinguishable on the basis of size. Particles in one class may be longer, thicker or generally larger in two or more dimensions than particles in the other class. These classes may also be distinguishable on the basis of shape. The stream is introduced into a housing which is interiorly divided into two separate chambers by a screen plate. The stream is then divided into a second stream which passes through the screen plate which, compared to the original stream, has a larger proportion of small particles and a third stream which does not pass through the screen plate which has a larger proportion of large particles. Fluid in the primary or large particle chamber on the upstream side of the screen plate is discharged from the housing. The secondary or small particle chamber on the downstream side of the screen plate is divided by a fluid impermeable interior wall into two separate sections. From one of these sections fluid is recycled back into the original stream for reintroduction into the housing. From the other section of the small particle chamber fluid is outputed from the housing at a particularly advantageous separation efficiency. Within the scope of the present invention, the above described method may be repeated one or more times in succession.

BRIEF DESCRIPTION OF THE DRAWINGS

The present invention is further described with reference to the accompanying drawings in which.

DETAILED DESCRIPTION

Figure 1:
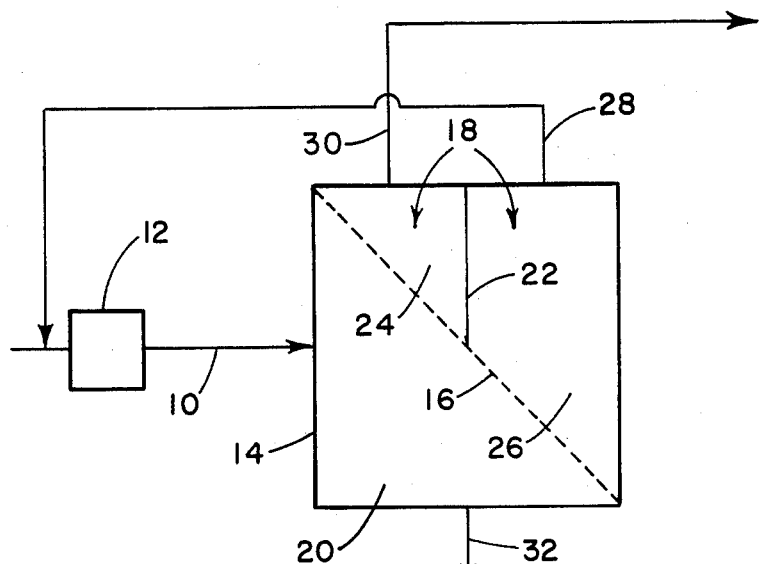
FIG. 1 is a schematic illustration of an apparatus in which a preferred embodiment of the present invention may be practiced.

One possible use of the method of the present invention would be to separate "reject" fibers, or those particles of ligno-cellulosic fibrous material in wood pulp which are not considered acceptable for paper making from those generally smaller, thinner or shorter particles of ligno-cellulosic fibrous material known as "accept" fibers which are considered acceptable for this purpose. The method of the present invention can also be used to separate inorganic particles such as ash from the accept fibers. In FIG. 1 a hydraulic fluid medium containing both accept and reject fibers is transported in line 10 by means of pump 12 into a fluid containing housing 14. This housing is interiorly divided by a fluid permeable screen plate 16 into a secondary or accept chamber 18 and a primary or reject chamber 20. Because of the screen plate there are proportionately more accept fibers in the accept chamber than in the stream in line 10, and more reject fibers in the reject chamber than are in that stream. The accept chamber is itself divided by a fluid impermeable interior wall 22 into an output section 24 and a recirculation section 26. Both the output section and the recirculation section are at least partially bounded by the screen plate. Preferably, the output section is elevated with respect to at least part of the recirculation section. Particle containing fluid is recycled from the recirculation chamber by means of recirculation line 28 to the input line 10 from where this particle containing fluid will be reintroduced back into the housing. On the other hand, the particle containing fluid which enters the output section of the accept chamber is removed in accept output line 30 for further processing in the paper making process while the particle containing fluid in the reject output line is removed in reject output line 32 for further refining for the purpose of reducing these reject fibers to accept fibers. It will be appreciated that what is here described is a method in which a first and second class of particles, i.e. reject and accept fibers, respectively, are entrained in a first process fluid stream in line 10. This first process fluid stream is introduced into the primary or reject chamber 20 of the housing 14. By means of the screen plate 16 a second and a third process fluid stream are separated inside the housing, from the first process fluid stream. Because of the screening action of screen plate 16 there are smaller proportions of the first class of particles, i.e. reject fibers, in the second and the third process fluid stream than there is at any point in the first process fluid stream.

The second process fluid stream flows through the output section 24 of the accept chamber and is then discharged from the housing. The third process fluid stream flows through the recirculation section 26 of the accept chamber and is then recirculated to the first process fluid stream. The portion of the first process fluid stream which is not diverted into the second and third process fluid streams, continues to flow through the reject chamber and is discharged in reject output line 32. As will be demonstrated hereafter, the above described method results in highly efficient separation as compared to methods heretofore known in the art.

Figure 2:
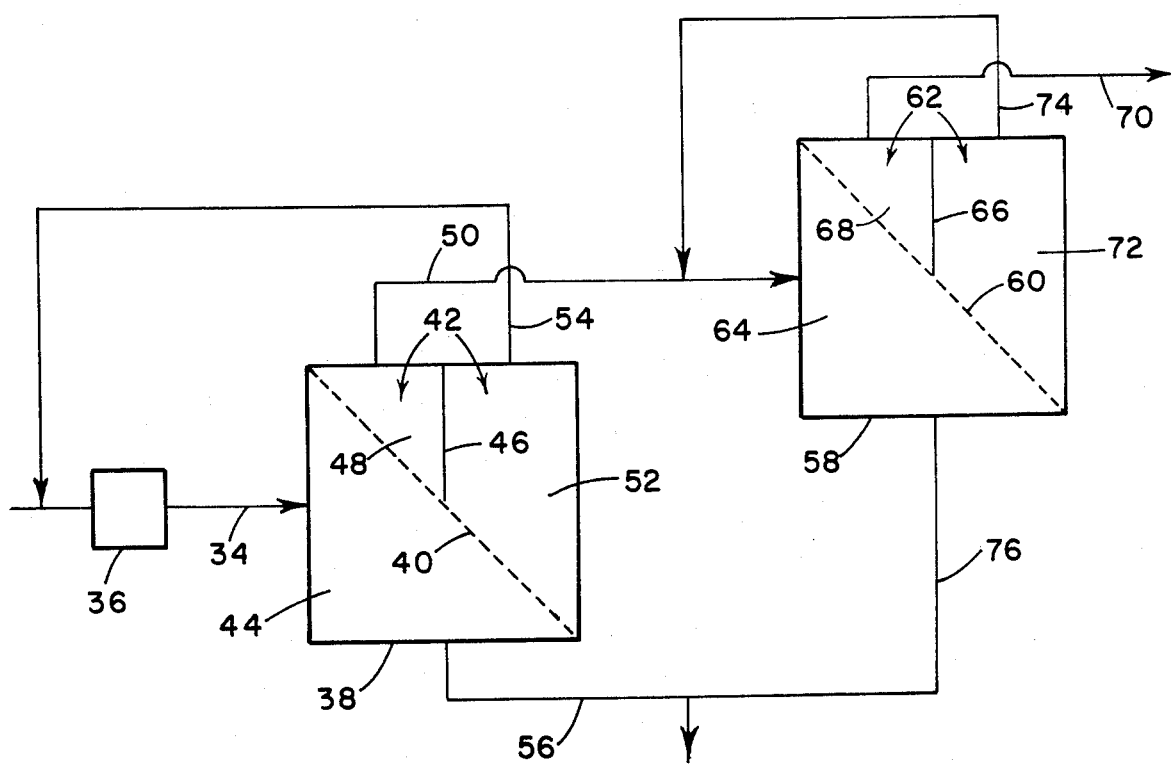
FIG. 2 is a schematic illustration of an apparatus in which an alternate embodiment of the present invention may be practiced.

In an alternate embodiment of the present invention, the above described method may be repeated one or more times. Referring, for example, to FIG. 2, water with accept and reject fibers suspended therein is removed through input line by means of pump 36 to housing 38. This housing is divided by screen plate 40 into a secondary or accept chamber 42, having proportionately more accept fibers than are present in input line 34, and a primary or reject chamber 44, in which proportionately more reject fibers are present than in input line 34. Interior wall 46 divides the accept chamber into an output section 48 from which fluid is removed in an accept transfer line 50 and a recirculation section 52 from which fluid is recirculated to input line 34 in recirculation line 54. Fluid is removed from the reject chamber in reject output line 56.

Fluid in accept transfer line 50 is introduced into a second housing 58 which is also medially divided by screen plate 60 into a secondary or accept chamber 62 and a primary or reject chamber 64. Interior wall 66 divides the accept chamber 62 into output section 68 from which fluid is finally outputed in accept output line 70 and recirculation chamber 72 from which fluids recirculated to accept transfer line. Fluid from reject chamber 64 is outputed in reject output line 76 which connects with reject output line 56.

It will be appreciated that in this alternate embodiment, the method which takes place in housing 38 is the same as takes place in housing 14, as is described above in connection with the first embodiment. In this alternate embodiment, however, the second process fluid stream discharged from housing 38 in transfer line 50 is then introduced into the primary or reject chamber 64 of the second housing 58. By means of the screen plate 60 a fourth and a fifth process fluid stream are separated, inside the housing, from the second process fluid stream. Because of the screening action of screen plate 60 there are smaller proportions of the first class of particles, i.e. reject fibers, in the fourth and the fifth process fluid stream than there is at any point in the second process fluid stream.

The fourth process fluid stream flows through the output section 68 of the accept chamber 62 and is then discharged from the housing 58. The fifth process fluid stream flows through the recirculation section 72 of the accept chamber 62 and is then recirculated to the second process fluid stream. The portion of the second process fluid stream which is not separated into the fourth and fifth process fluid streams, continues to flow through the reject chamber 64 and is discharged in reject output line 76.

Figure 3:
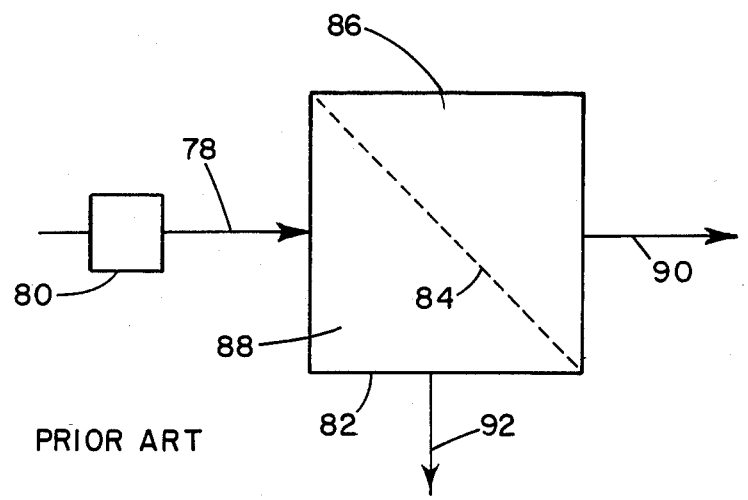
FIGS. 3-5 are schematic illustrations of various apparatus used in the prior art for screening and fractionation.

To demonstrate the advantage of the above described systems in comparison with some of those heretofore used, a number of prior art systems will be described herein. One such system is shown in FIG. 3. In that system, fluid having particles suspended therein is introduced in input line 78 by means of pump 80 into housing 82. That housing is interiorly divided by screen plate 84 into an accept chamber 86 and a reject chamber 88. Fluid having a higher proportion of accept particles than is present in the fluid in input line 78 is outputed in accept output line 90. Fluid having a higher proportion of reject particles suspended therein than is present in the input line 78 is outputed in reject output line 92.

Figure 4:
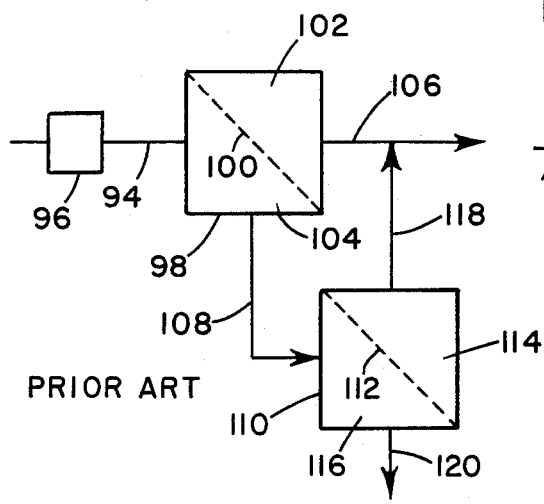

A second prior art arrangement is shown in FIG. 4. In this system, fluid having particles suspended therein is moved in line 94 by means of pump 96 to housing 98. Screen plate 100 divides this housing into an accept chamber 102 and a reject chamber 104. Fluid having an increased proportion of accept particles is removed for further processing elsewhere from the accept chamber 102 in accept output line 106 while fluid having an increased proportion of reject particles is removed in reject transfer line 108 to a second housing 110. This housing is divided by screen plate 112 into an accept chamber 114 and a reject chamber 116. Fluid is outputed from the accept chamber 114 in accept output line 118 which connects with line 106. Fluid is outputed from the reject chamber 116 in reject output line 120.

Figure 5:
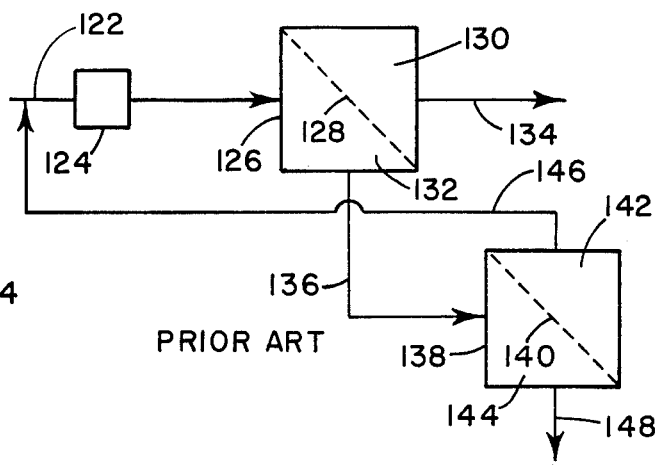

Still another prior art system is shown in FIG. 5. Here fluid in which particulate material is suspended is moved in input line 122 by means of pump 124 to housing 126. This housing is divided by screen plate 128 into accept chamber 130 and reject chamber 132. Fluid having an increased proportion of accept particles is removed from the system for further processing from accept chamber 130 in line 134. Fluid having an increased proportion of reject particles is removed from the reject chamber 132 in reject transfer line 136 to housing 138. This housing is divided by screen plate 140 into accept chamber 142 and reject chamber 144. Fluid having a further increased proportion of accept particles is recycled from accept chamber 142 to input line 122 for further particle separation in the system. Fluid having a further increased proportion of reject particles is outputed from the reject chamber 144 in reject output line 148.

The advantages of the system of the present invention over the above described systems of the prior art is demonstrated by the following analysis.

Screening or fractionation efficiency is a function of the size and shape of the particles to be separated, the perforation of the screen plates and the general operating conditions of the screen. The screening or fractionation efficiency is expressed by the term "separation efficiency" which is the ratio of particles to be separated in the dedicated flow to particles to be separated in the feed flow.

Figure 6:
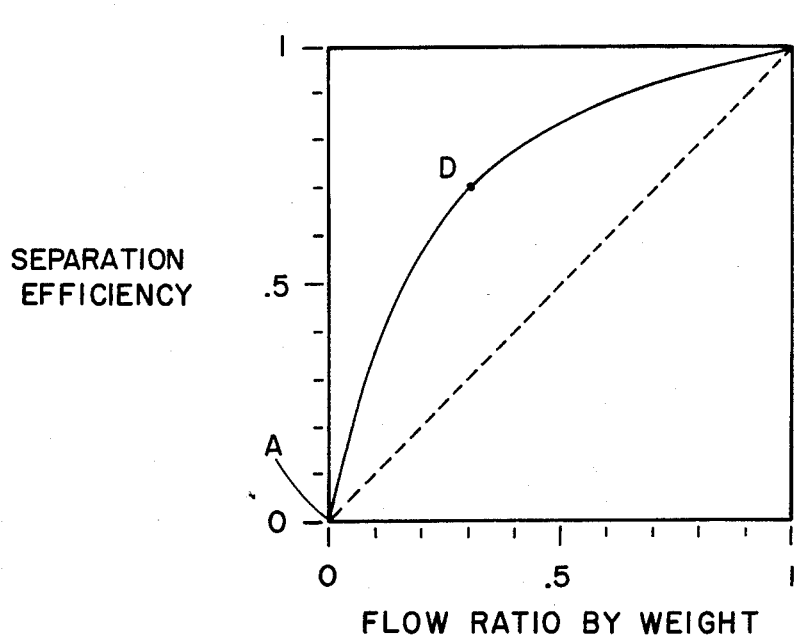
FIG. 6 is a curve showing the relationship between separation efficiency and flow rate by weight for a typical screening or fractionation process.

Separation follows statistical rules and the relative efficiency will be dependent on the ratio of the flows. FIG. 6 refers to a typical case of separating shives from a flow of wood pulp. The flow ratio is the ratio of the weight of the wood pulp in the dedicated flow to the weight of wood pulp in the feed flow.

For clarification, the following hypothetical examples are used. A product flow holds two kinds of particles "A" and "B", "A" being 20% by weight and "B" being 80% by weight of the total particle flow. If at a flow ratio of 0.2 all "A" particles would be in the dedicated flow the separation efficiency would be 1.0. If at a flow ratio of 0.2, 50% of the "A" particles would be in the dedicated flow, the separation efficiency would be 0.5.

To further illustrate these terms, a mechanical wood pulp holding 1.0% shives by weight is fed to a screen operating with a flow ratio of 0.1 and a separation efficiency of 0.3. Under these circumstances, the concentration of shives has risen to 3.0% in the dedicated flow, normally referred to as the reject flow. Correspondingly the shive concentration in the other flow, normally referred to as the accept flow, has decreased to 0.78%.

In FIG. 6 the solid line AB represents a typical separation efficiency curve for mechanical wood pulps. The dotted line AB represents a case where there is no screening or fractionating action at the screen plate. It is clear that in screening and fractionation it is of advantage to obtain flows which are as well defined as possible. It is clear from FIG. 6 that because of the statistical nature of the screening and fractionation action a complete separation or separation efficiency of 1.0 cannot be accomplished. Typically the flow in line 92 in FIG. 3 is increased in the event the amount of undersirable particles in the flow line 90 is to be reduced. This adjustment leads to a lower concentration of these particles in flow 92. The net effect being that either an increasing amount of desirable particles have to be discarded with the undersirable ones or an upgrading operation will be less efficient. Typically the flow in line 92 in FIG. 3 is reduced if a higher concentration of desirable particles is to be achieved in this flow. This adjustment causes an increased loss of these particles into the flow line 90.

It is well known that the above mentioned problems can be alleviated by installing additional screening or fractionation stages as is shown in FIGS. 4-5. It is evident, however, that such improvements in separation efficiency are accomplished by making systems more complex and thus more costly. The total hydraulic flow in the system increases as the amount of recirculation increases, and additional pumping power is accordingly required. Increased numbers of screening or fractionation units necessitate the use of increased amounts of electrical power. Hence increased separation efficiency has, in systems heretofore known, been accompanied by higher operating costs.

The advantage of the present invention is that increased separation efficiency can be accomplished while the investment and operating costs of the screening or fraction system are reduced. This advantage results from the fact that instead of the earlier practiced rescreening in separate units, the rescreening is done in one and the same screen by recirculation of part of the flow. The improved separation efficiency stems from the fact that with this arrangement the screens work at the DB section of the separation efficiency curve in FIG. 6 whereas the primary screens in FIGS. 3-5 work at the AD section of the separation efficiency curve.

The above described advantages are further illustrated in the following example.

EXAMPLE

Six comparative screening systems are put into operation. The purpose of each of these systems is to separate reject fibers known as shives, from accept fibers. In each of these systems, these fibers are entrained together in a hydraulic fluid feed flow. For each of these systems, the relative hydraulic feed flow is initially 1.0, and the overall system flow ratio for each of them is 0.15. Additionally, for each of these systems the proportion of shives to total particles in the feed flow is 1.0%. and the relationship between separation efficiency and flow ratio by weight is that which is shown in FIG. 6. These systems and their resultant separation capabilities are further described in the following sections. For the sake of simplicity in these sections the fluid flow in a particular line in FIGS. 1-5 will be referred to by the numeral designating that line above. Also, entire screen devices will be referred to by the numeral designating that device's housing above.

A. System I

This system is a conventional single stage screening system as is shown in FIG. 3. The flow ratio is 0.15 so that from FIG. 6 separation efficiency is 0.40. The relative accepts and rejects flow are thus 0.85 and 0.15, respectively. Under the above circumstances, shive levels in the accept and reject flow are calculated as follows:

The rejects flow holds 0.01×0.4 (separation efficiency)=0.004 shives.
The accepts flow holds=0.01 shives−0.004 shives=0.006 shives (based upon definitions that: feed−reject=accept).
Shive level in accepts=(0.006/0.85)=0.0071 =0.71%.
Shive level in rejects=(0.004/0.15)=0.0267 =2.67%.

B. System II

This system is a conventional two stage, cascade system as is shown in FIG. 4. The flow ratio for screen 98 is 0.30. The flow ratio for screen 110 is 0.50. Corresponding separation efficiencies are 0.60 and 0.82 (based on the curve in FIG. 6). Shive levels and relative hydraulic flows are calculated as follows for this system.

The system flow rate (flow 120 out of flow 94) equals the flow ratio of screen 98 times flow ratio of screen 110 or =0.30×0.50=0.15.
The system separation efficiency is 0.60×0.82=0.49.
Shive level in accepts (combination of flows 106 and 118) is (0.0051/0.85)=0.006=0.6%.

Shive level on rejects (flow 120) is (0.0049/0.15)=0.0327=3.27%.

Relative hydraulic flow is flow 94+flow 108=1.0+0.3=1.30.

C. System 111

This system is a conventional, two stage cascade system as is shown in FIG. 5. The flow ratio for screen 126 is 0.26. The flow ratio for screen 138 is 0.50. Corresponding separation efficiencies (from FIG. 6) are 0.57 and 0.82. Flow 122 is 1.0. Flow 134 is 0.15 based upon a 0.15 system flow ratio. Because the flow ratio of screen 138 is 0.50, flow 136 is (0.15/0.50)=0.30.

Flow 146 returning to screen 126 is 0.30−0.15=0.15 and the combined feed flow to screen 126 (flow 122+flow 146) is 1.0+0.15=1.15.

Hence the flow ratio for screen 126 is (flow 136 over flow 122+flow 146)

$$(0.30/1.15) = 0.26.$$

The relative hydraulic flow is $$1.15 + 0.30 = 1.45.$$

Balancing out the shive flows gives the shive levels for the accept flow (flow 134) and the rejects flow (flow 148).

If the shive level in the screen 126 feed flow (flow 122+flow 146) is called Z and the shive level in accept flow 134 is called $\overline{X}$ and the shive level in rejects flow 148 is called Y then shive levels and system separation efficiency are calculated as follows:

$$(1.15 \times Z)(1-0.57) = 0.85 \times \overline{X} \qquad (a)$$

$$(1.15 \times Z) \times 0.57 \times 0.82 = 0.15 \times Y \qquad (b)$$

$$0.85 \times \overline{X} + 0.15 \times Y = 1.0 \times 0.01 \qquad (c)$$

or
accept shive level is 0.47%, and
reject shive level is 3.47%.
System separation efficiency is $$\frac{0.15 \times 0.0347}{1.0 \times 0.01} = 0.52.$$

D. System IV

This system is a conventional, two stage cascade system as is shown in FIG. 5. The flow ratio for screen 126 is 0.33. The flow ratio for screen 138 is 0.35. Corresponding separation efficiencies are, respectively, 0.71 and 0.73 (from FIG. 6). Because the above defined system flow ratio 0.15, flow 134 is 0.15. Thus, flow 136 is $$(0.15/0.35) = 0.43.$$

Return flow 126 is 0.43−0.15=0.28.
The combined flow to screen 126 (flow 122+flow 146) is $$1.0 + 0.28 = 1.28.$$

The relative hydraulic flow is $$1.28 + 0.43 = 1.71.$$

Using the same variables as for System III above, the shive level and system separation efficiency are calculated as follows:

$$(1.28 \times Z)(1-0.71) = 0.85 \times \overline{X} \qquad (a)$$

$$(1.28 \times Z) \times 0.71 \times 0.73 = 1.15 \times Y \qquad (b)$$

$$0.85 \times \overline{X} + 0.15 \times Y = 1.0 \times 0.01 \qquad (c)$$

or
accept shive level is 0.42%, and
reject shive level is 4.29%.
The system separation efficiency is $$\frac{0.15 \times 0.0429}{1.0 \times 0.01} = 0.64.$$

E. System V

This system is a single stage screening system of the present invention as is shown in FIG. 1 in which 0.10 of the initial relative hydraulic feed flow of 1.00 is recirculated so that there is a recirculated relative hydraulic feed flow of 1.10. Hence the flow ratio for the output section 24, in screen 14 is $$\frac{1.1 - 0.85}{1.1} = 0.23.$$

The flow ratio for the reject section 26 is $$\frac{0.15}{1.1 - 0.85} = 0.60.$$

The corresponding separation efficiencies for the two screen sections are 0.54 and 0.85. If the shive level for the accepts flow 30 is called $\overline{X}$ and the shive level for the rejects flow 32 is called Y and the shive level for the feed flow 10+28 is called Z then, the shive level and system separation efficency are calculated as follows:

$$(1.1 \times Z)(1-0.54) = 0.85 \times \overline{X} \qquad (a)$$

$$(1.1 \times Z) \times 0.54 \times 0.85 = 0.15 \times Y \qquad (b)$$

$$0.85 \times \overline{X} + 0.15 \times Y = 1.0 \times 0.01 \qquad (c)$$

or
accept shive level is 0.59%, and
reject shive level is 3.33%.
The system separation efficiency is $$\frac{0.15 \times 0.0333}{1.0 \times 0.01} = 0.50.$$

F. System VI

The system is a single stage screening system of the present invention as is shown in FIG. 1 in which 0.50 of the initial relative hydraulic feed flow is recirculated so that there is a recirculated relative hydraulic feed flow of 1.50. The flow rate for the output section 24 is $$= \frac{1.5 - 0.85}{1.5} = 0.43.$$

The flow rate for the reject section 26 is $$= \frac{0.15}{1.15 - 0.85} = 0.23.$$

The corresponding separation efficiencies are 0.77 and 0.54. Using the same variables as for System V above, the shive level and system separation efficiency are calculated as follows:

$$(1.5 \times Z)(1-0.77) = 0.85 \times \overline{X} \qquad (a)$$

$$(1.5 \times Z) \, 0.77 \times 0.54 = 0.15 \times Y \qquad (b)$$

$$0.85 \times X + 0.15 \times Y = 1.0 \times 0.01 \qquad (c)$$

or
accepts shive level is 0.42%, and rejects shive level is 4.29%.
The system separation efficiency is $$= \frac{0.15 \times 0.9429}{1.0 \times 0.01} = 0.64.$$

For the above systems, the separation efficiency, the relative hydraulic flow, the shive level in accepts flow and the shive level in rejects flow is summarized in the following Table 1.

TABLE 1

| System | Separation efficiency | Relative Hydraulic flow | Shive level in accepts flow % | Shive level in rejects flow % |
|---|---|---|---|---|
| I | 0.40 | 1.00 | 0.71 | 2.67 |
| II | 0.49 | 1.30 | 0.60 | 3.27 |
| III | 0.52 | 1.45 | 0.57 | 3.47 |
| IV | 0.64 | 1.71 | 0.42 | 4.29 |
| V | 0.50 | 1.10 | 0.59 | 3.33 |
| VI | 0.64 | 1.50 | 0.42 | 4.29 |

It is clear from Table 1 that the improved separation efficiency of the recirculation screen is the result of an increased feed flow to the screen. This normally means increased hydraulic flow and increased usage of pumping power. By going to a higher concentration of particles in the hydraulic fluid, the productivity of a fixed size screen can be increased. For liquids holding fiberous particles this can be done at concentration so high that the feed flow in a recirculation screen could be considerably less than in a single screen.

Although the method of the present invention may be used in any type of screening or fractionation operation, it is considered to be particularly useful when there is a system flow ratio of from about 0.05 to about 0.30. Such particular usefulness is also considered to exist where the total concentration of particles entrained to the fluid stream to be processed is from about 0.5 percent to about 15 percent by weight. This method is particularly advantageous when used with low consistency screens at a concentration of from about 0.8 to 1.5 percent by weight or with high concentration screens at a concentration of about 8 to 15 percent by weight.

Although the invention has been described with a certain degree of particularity, it is to be understood that the present disclosure has been made only as an example and that the scope of the invention is defined by what is hereafter claimed.

What is claimed is:

1. A method for at least partially separating a first class of particles from a second class of particles, said first class of particles being larger in at least one dimension than said second class of particles, comprising the steps of:

(a) entraining said first and second classes of particles in a first process fluid stream and then introducing said first process fluid stream into a primary chamber of a housing interiorly divided by a screening means into said primary chamber and a secondary chamber with said secondary chamber itself being divided into a recirculation section and an output section by an interior wall extending between about the screen member to about the housing such that each of said sections are at least partially bounded by the screening means (b) within said housing, separating a second and a third process fluid stream from said first process fluid stream, said second process fluid stream flowing through the screening means into the output section of the secondary chamber of the housing and said third process fluid stream flowing through the screening means into the recirculating chamber of said secondary chamber, such that said second and third process fluid steams contain a lower proportion of said first class of particles as compared to said second class of particles than does said first process fluid stream;

(c) discharging the portion of the first process fluid stream not passing through the screening means from the primary chamber through the housing and discharging said second process fluid stream through said housing from the output section of the secondary chamber; and (d) recirculating said third process fluid stream from the recirculation section of the primary chamber to the first process fluid stream.

2. The method defined in claim 1 wherein there are performed the additional steps of:

(e) introducing the second process fluid stream into a primary chamber of a second housing interiorly divided by a screening means into said primary chamber and a secondary chamber with said secondary chamber itself being divided into a recirculating section and an output section by an interior wall extending between about the screen member to about the housing such that each of said sections are at least partially bounded by the screening means;

(f) within said second housing, separating a fourth and a fifth process fluid stream from said second process fluid stream, said fourth process fluid stream flowing through the screening means into the output section of the secondary chamber of the housing and said fifth process fluid stream flowing through the screening means into the recirculation chamber of said secondary chamber, such that said fourth and fifth process fluid streams contain a lower proportion of said first class of particles as compared to said second class of particles than does said second process fluid stream;

(g) discharging the portion of the second process fluid stream not passing through the screening means of the second housing from the primary chamber of the second housing through the second housing and discharging said fourth process fluid stream through said housing from the output section of the secondary chamber; and (h) recirculating said fifth process fluid stream from the recirculation section of the primary chamber to the second process fluid stream.

3. The method defined in claim 1 or 2 wherein the first and second classes of particles are distinguishable based on shape.

4. The method defined in claim 1 wherein, in the secondary chamber of the housing, the output section is elevated with respect to at least part of the recirculation section.

5. The method defined in claim 2 wherein, in the secondary chamber of the second housing, the output chamber is elevated with respect to at least part of the recirculation chamber.

6. The method defined in claim 1 wherein the fluid is a hydraulic fluid.

7. The method defined in claim 6 wherein the particles are fibrous particles.

8. The method defined in claim 7 wherein the particles are lignocellulosic fibers.

9. The method defined in claim 8 wherein particles in the first class of particles are longer than are particles in the second class of particles and wherein there is a smaller proportion of the first class of particles in the second and third process fluid streams than there are in the first process fluid stream.

10. The method defined in claim 6 wherein the first class of particles includes at least some inorganic particles and the second class of particles are fibrous particles and wherein there is a smaller proportion of the first class of particles in the second and third process fluid streams than there are in the first process fluid stream.

11. The method defined in claim 10 wherein the inorganic particles consist of ash.

12. The method defined in claim 6 wherein the total concentration of all particles in the first process fluid stream upstream from the housing is from about 0.5 percent to about 15 percent by weight.

13. The method defined in claim 12 wherein the total concentration of all particles in the first process fluid stream upstream from the housing is from about 0.8 percent to about 1.5 percent by weight.

14. The method defined in claim 12 wherein the total concentration of all particles in the first process fluid stream upstream from the housing is from about 8 percent to about 15 percent by weight.

15. The method defined in claim 6 wherein there is a system flow ratio of from about 0.05 to about 0.30.

* * * * *